United States Patent
Xu

(10) Patent No.: US 10,563,517 B2
(45) Date of Patent: Feb. 18, 2020

(54) GAS TURBINE ENGINE V-SHAPED FILM COOLING HOLE

(71) Applicant: United Technologies Corporation, Hartford, CT (US)

(72) Inventor: JinQuan Xu, East Greenwich, RI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 701 days.

(21) Appl. No.: 14/769,983

(22) PCT Filed: Mar. 13, 2014

(86) PCT No.: PCT/US2014/025368
§ 371 (c)(1),
(2) Date: Aug. 24, 2015

(87) PCT Pub. No.: WO2014/197061
PCT Pub. Date: Dec. 11, 2014

(65) Prior Publication Data
US 2016/0003056 A1 Jan. 7, 2016

Related U.S. Application Data

(60) Provisional application No. 61/788,475, filed on Mar. 15, 2013.

(51) Int. Cl.
*F01D 5/18* (2006.01)
*B22F 5/04* (2006.01)
(Continued)

(52) U.S. Cl.
CPC .............. *F01D 5/186* (2013.01); *B22C 9/10* (2013.01); *B22F 3/1055* (2013.01); *B22F 3/24* (2013.01);
(Continued)

(58) Field of Classification Search
CPC ....... B22C 9/10; B22C 7/02; B22F 2005/103; B22F 3/1055; B22F 3/24; B22F 5/04; B22F 5/10; F01D 5/186
(Continued)

(56) References Cited

U.S. PATENT DOCUMENTS 4,676,719 A * 6/1987 Auxier .................... F01D 5/186
415/115
4,726,735 A 2/1988 Field et al.
(Continued)

FOREIGN PATENT DOCUMENTS

EP 2374996 10/2011
EP 2551041 1/2013
(Continued)

OTHER PUBLICATIONS

International Preliminary Report on Patentability for International Application No. PCT/US2014/025368 dated Sep. 24, 2015.
(Continued)

*Primary Examiner* — Mary Davis
*Assistant Examiner* — Paul W Thiede
(74) *Attorney, Agent, or Firm* — Carlson, Gaskey & Olds, P.C.

(57) ABSTRACT

A component for a gas turbine engine includes a wall that adjoins an interior cooling passage and provides an exterior surface. A film cooling hole fluidly connects the interior cooling passage and the exterior surface. The film cooling passage includes inlet and outlet passages that fluidly interconnect and adjoin one another in a misaligned non-line of sight relationship.

16 Claims, 8 Drawing Sheets

(51) Int. Cl.
 *B22F 5/10*  (2006.01)
 *B22C 9/10*  (2006.01)
 *B22F 3/105*  (2006.01)
 *F23R 3/00*  (2006.01)
 *B22F 3/24*  (2006.01)

(52) U.S. Cl.
 CPC ............ *B22F 5/04* (2013.01); *B22F 5/10* (2013.01); *F23R 3/002* (2013.01); *B22F 2005/103* (2013.01); *F05D 2230/21* (2013.01); *F05D 2240/81* (2013.01); *F05D 2250/314* (2013.01); *F05D 2260/202* (2013.01); *F05D 2260/204* (2013.01); *F23R 2900/03042* (2013.01); *Y02P 10/292* (2015.11); *Y02P 10/295* (2015.11)

(58) Field of Classification Search
 USPC ............ 416/96 R, 97 R; 415/115; 427/554
 See application file for complete search history.

(56) References Cited

U.S. PATENT DOCUMENTS

| | | | |
|---|---|---|---|
| 5,250,136 | A | 10/1993 | O'Connor |
| 5,688,104 | A | 11/1997 | Beabout |
| 7,374,401 | B2 | 5/2008 | Lee |
| 7,537,431 | B1 | 5/2009 | Liang |
| 8,057,182 | B2 * | 11/2011 | Brittingham ............ F01D 5/186 415/115 |
| 8,168,912 | B1 | 5/2012 | Liang |
| 8,171,978 | B2 * | 5/2012 | Propheter-Hinckley ............ B22C 7/02 164/246 |
| 8,245,519 | B1 | 8/2012 | Liang |
| 2005/0100437 | A1 | 5/2005 | Phillips et al. |
| 2006/0083614 | A1 | 4/2006 | Cunha et al. |
| 2007/0104576 | A1 | 5/2007 | Cunha et al. |
| 2007/0116569 | A1 | 5/2007 | Cunha et al. |
| 2007/0177975 | A1 | 8/2007 | Luczak et al. |
| 2008/0060781 | A1 | 3/2008 | Santeler |
| 2008/0131285 | A1 | 6/2008 | Albert et al. |
| 2008/0138209 | A1 | 6/2008 | Cunha et al. |
| 2010/0129194 | A1 * | 5/2010 | Propheter-Hinckley ............ B22C 7/02 415/115 |
| 2010/0129231 | A1 | 5/2010 | Brittingham et al. |
| 2011/0262695 | A1 * | 10/2011 | Lee ............ F01D 5/182 428/131 |
| 2012/0027619 | A1 | 2/2012 | Albert et al. |
| 2012/0051941 | A1 * | 3/2012 | Bunker ............ F01D 5/186 416/97 R |
| 2013/0004680 | A1 * | 1/2013 | Godfrey ............ B22F 3/1055 427/554 |
| 2013/0052037 | A1 * | 2/2013 | Abdel-Messeh ........ F01D 5/186 416/97 R |
| 2013/0280081 | A1 | 10/2013 | Propheter-Hinckley et al. |
| 2013/0280093 | A1 * | 10/2013 | Zelesky ............ B22C 9/10 416/97 R |
| 2019/0257206 | A1 * | 8/2019 | Webster ............ F01D 5/187 |

FOREIGN PATENT DOCUMENTS

| | | |
|---|---|---|
| EP | 2565383 | 3/2013 |
| WO | 2014105108 | 7/2014 |

OTHER PUBLICATIONS

Extended European Search Report for European Application No. 14806912.3 dated Nov. 14, 2016.
U.S. Appl. No. 13/454,221, filed Apr. 24, 2012, "Gas Turbine Engine Airfoil Geometries and Cores for Manufacturing Process".
International Search Report and Written Opinion for International Application No. PCT/US2014/025368 dated Dec. 17, 2014.

* cited by examiner

GAS TURBINE ENGINE V-SHAPED FILM COOLING HOLE

BACKGROUND

This disclosure relates to a gas turbine engine. In particular, the disclosure relates to cooling features and an example core manufacturing process that produces a core providing such features.

Components, such as airfoils, particularly those used in a hot section of a gas turbine engine, incorporate internal cooling features. Current airfoil manufacturing techniques limit possible cooling configurations. Typically, the airfoil is cast within a mold having at least first and second portions secured to one another to define an exterior airfoil surface. The core structure used to form the impingement holes and cooling passages must be retained between the mold portions, which limit the location and configuration of the core, which is quite fragile. The core is typically assembled from multiple elements constructed from different material. The elements are glued to one another through a painstaking assembly process, which may result in scrapped cores.

Film cooling holes are provided at various locations on the airfoil to supply cooling fluid to the exterior airfoil surface. One type of film cooling hole geometry extends from an inlet passage that communicates with a cooling passage to an outlet that terminates at the exterior airfoil surface. The outlet may be diffuser shaped, if desired. Using traditional film cooling hole forming methods, such as laser machining, electro discharge machining, or drilling, the inlet and outlet passages must be generally coaxially aligned with one another.

SUMMARY

In one exemplary embodiment, a component for a gas turbine engine includes a wall that adjoins an interior cooling passage and provides an exterior surface. A film cooling hole fluidly connects the interior cooling passage and the exterior surface. The film cooling passage includes inlet and outlet passages that fluidly interconnect and adjoin one another in a misaligned non-line of sight relationship.

In a further embodiment of the above, the inlet and outlet passages are generally linear.

In a further embodiment of any of the above, the inlet and outlet passages are arranged at an angle relative to one another.

In a further embodiment of any of the above, the angle is acute.

In a further embodiment of any of the above, the outlet passage provides a diffuser shape.

In a further embodiment of any of the above, the inlet passage provides a metering section that has a cross-sectional area that is less than a cross-sectional area of the outlet portion.

In a further embodiment of any of the above, the inlet passage includes first and second metering portions. The second metering portion adjoins the outlet passage and includes a length L and a diameter D having an L/D ratio of greater than 1.

In a further embodiment of any of the above, the L/D ratio is greater than 3.

In a further embodiment of any of the above, the film cooling hole is additively manufactured.

In a further embodiment of any of the above, the component is one of an airfoil combustor BOAS and platform.

In another exemplary embodiment, a method of manufacturing airfoil component for a gas turbine engine includes depositing multiple layers of a powdered metal onto one another. The layers are joined to one another with reference to CAD data relating to a particular cross-section. A film cooling hole geometry is produced corresponding to inlet and outlet passages fluidly interconnecting and adjoining one another in a misaligned, non-line of sight relationship.

In a further embodiment of any of the above, the producing step includes manufacturing a core that provides the film cooling hole geometry.

In a further embodiment of any of the above, the core includes molybdenum.

In a further embodiment of any of the above, the producing step includes forming the film cooling hole in response to the joining step producing a wall.

In a further embodiment of any of the above, the inlet and outlet passages are generally linear.

In a further embodiment of any of the above, the inlet and outlet passages are arranged at an angle relative to one another.

In a further embodiment of any of the above, the angle is acute.

In a further embodiment of any of the above, the outlet passage provides a diffuser shape.

In a further embodiment of any of the above, the inlet passage is provided during the depositing step. The outlet passage is provided by machining.

BRIEF DESCRIPTION OF THE DRAWINGS

The disclosure can be further understood by reference to the following detailed description when considered in connection with the accompanying drawings wherein.

DETAILED DESCRIPTION

Figure 1:
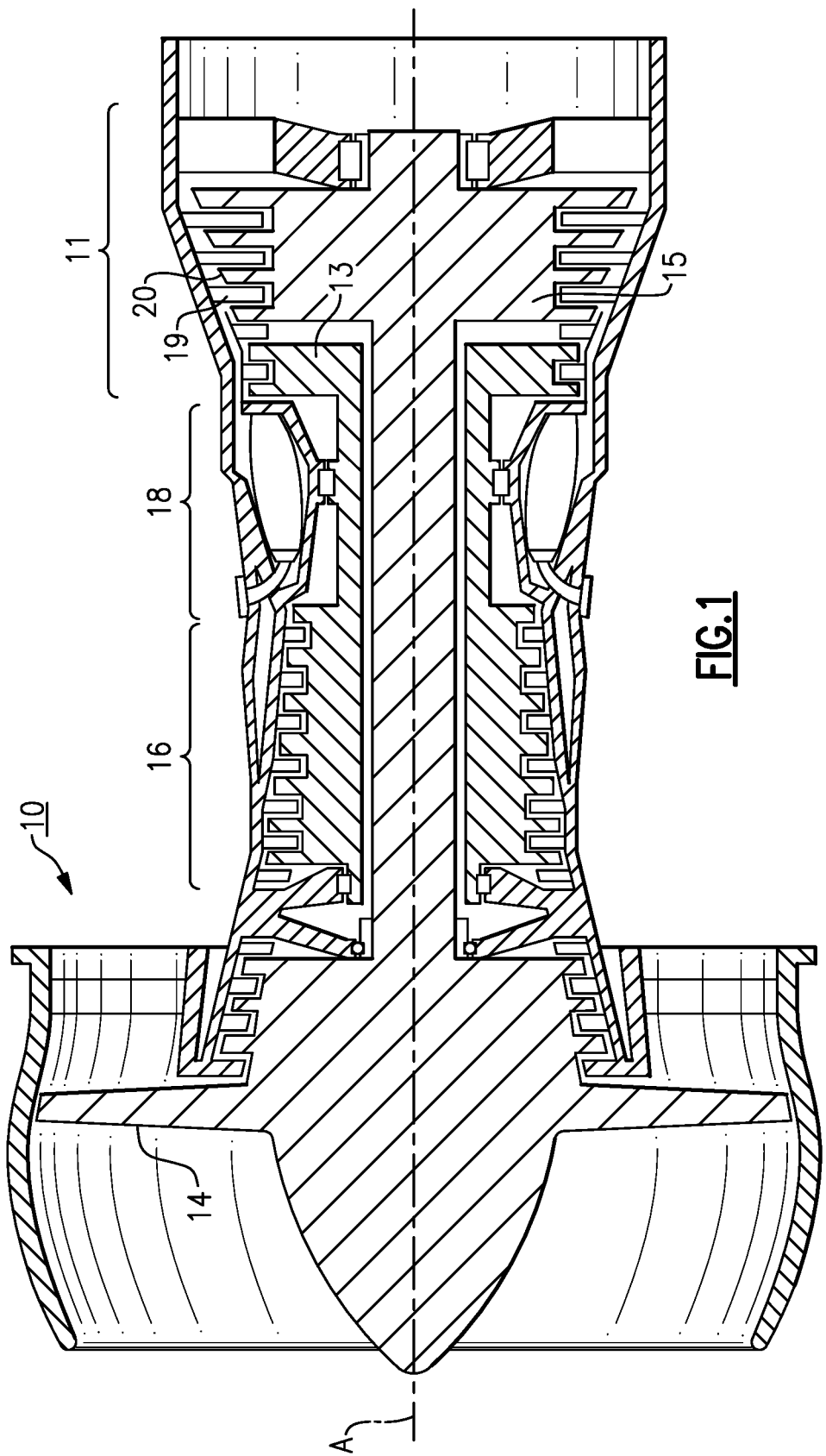
FIG. 1 is a schematic view of a gas turbine engine incorporating the disclosed airfoil.

FIG. 1 schematically illustrates a gas turbine engine 10 that includes a fan 14, a compressor section 16, a combustion section 18 and a turbine section 11, which are disposed about a central axis A. As known in the art, air compressed in the compressor section 16 is mixed with fuel that is burned in combustion section 18 and expanded in the turbine section 11. The turbine section 11 includes, for example, rotors 13 and 15 that, in response to expansion of the burned fuel, rotate, which drives the compressor section 16 and fan 14.

The turbine section 11 includes alternating rows of blades 20 and static airfoils or vanes 19. It should be understood that FIG. 1 is for illustrative purposes only and is in no way intended as a limitation on this disclosure or its application.

Figure 2A:
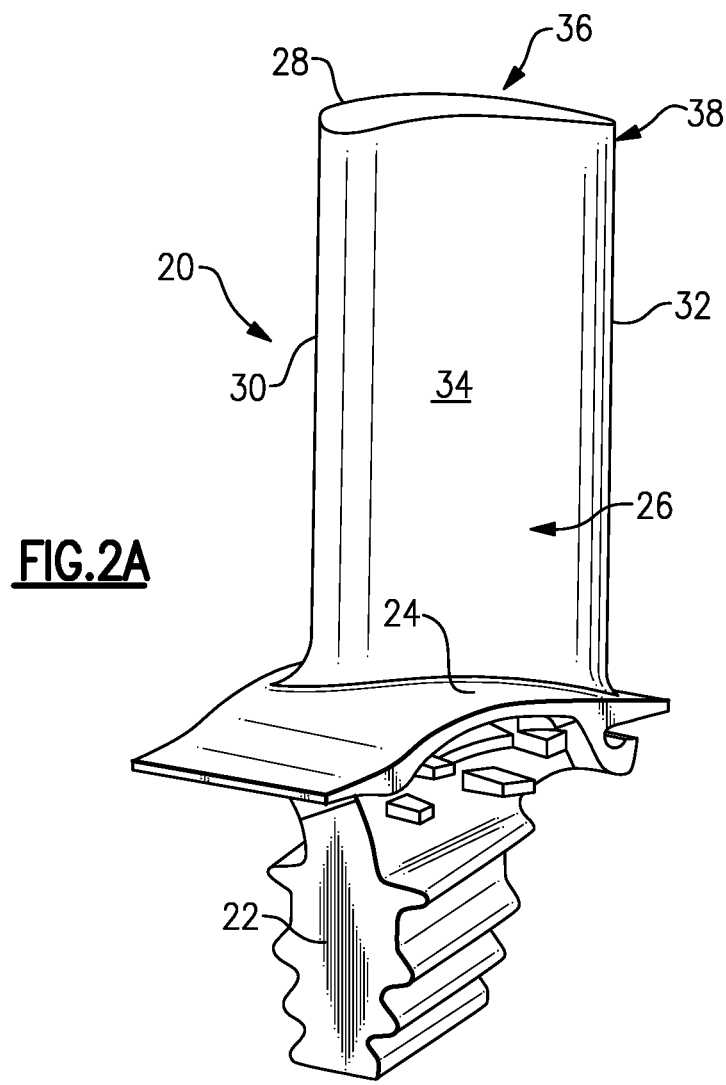
FIG. 2A is a perspective view of the airfoil having the disclosed cooling passage.

An example blade 20 is shown in FIG. 2A. The blade 20 includes a platform 24 supported by a root 22, which is secured to a rotor, for example. An airfoil 26 extends radially outwardly from the platform 24 opposite the root 22 to a tip 28. While the airfoil 26 is disclosed as being part of a turbine blade 20, it should be understood that the disclosed airfoil can also be used as a vane.

Figure 2B:
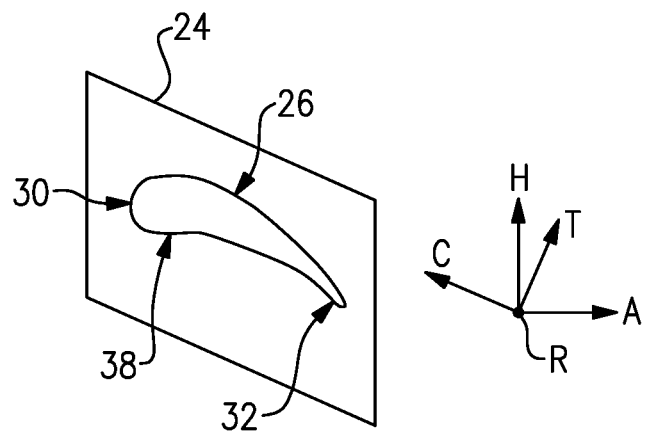
FIG. 2B is a plan view of the airfoil illustrating directional references.

Referring to FIG. 2B, the airfoil 26 includes an exterior airfoil surface 38 extending in a chord-wise direction C from a leading edge 30 to a trailing edge 32. The airfoil 26 extends between pressure and suction sides 34, 36 in an airfoil thickness direction T, which is generally perpendicular to the chord-wise direction C. Multiple airfoils 26 are arranged circumferentially in a circumferential direction H. The airfoil 26 extends from the platform 24 in a radial direction R to the tip 28. The exterior airfoil surface 38 may include multiple film cooling holes. The disclosed film cooling holes may also be provided in combustion liners, blade outer air seals and platforms, for example.

An example core 40 and resultant airfoil 26 is shown in FIGS. 3A-3D. As described in relation to FIG. 10, the airfoils disclosed may also be manufactured directly without the need of a core. In direct airfoil manufacturing, the airfoil features described as being provided by a core can be provided in the airfoil during the airfoil forming process.

The core 40 is provided by a refractory metal structure, constructed from molybdenum, for example, having a variable thickness. The core 40 is defined by an exterior surface 60 providing a contour. The exterior surface 60 including a uniform surface finish from the core manufacturing process, described in connection with FIG. 9 below, which results in a surface roughness to which suitable coatings will adhere. The exterior surface 60 is without machining, that is, milling, chemical etch, filing, or sanding. However, the exterior surface 60 may be finished in a slurry. As a result, coatings will adhere to the edges of the core 40.

Figure 3A:
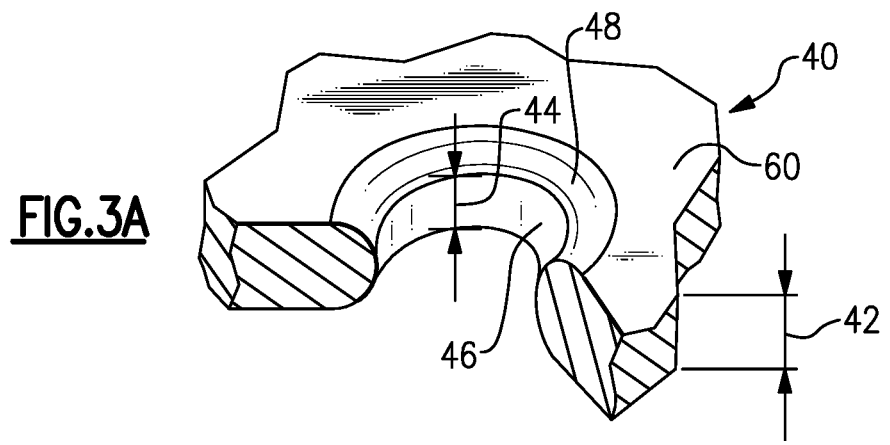
FIG. 3A is a partial cross-sectional view of an example core.
Figure 3B:
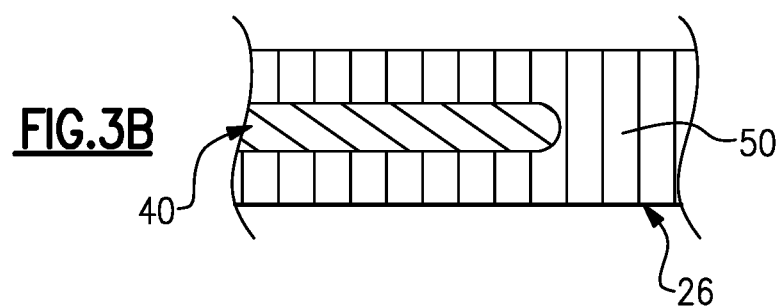
FIG. 3B is a perspective view of a portion of an airfoil with the core of FIG. 3A.
Figure 3C:
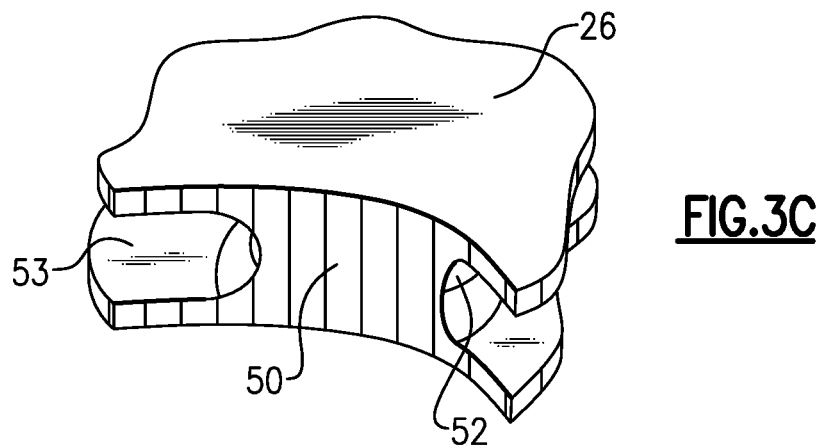
FIG. 3C is a perspective view of the airfoil of FIG. 3B without the core.
Figure 3D:
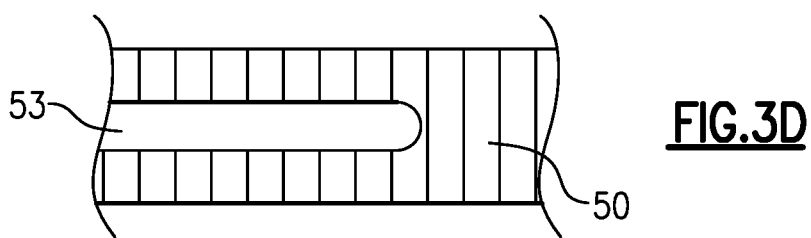
FIG. 3D is a cross-sectional view of the airfoil of FIG. 3C.

In the example, first and second thicknesses 42, 44 are different than one another. In one example, the first thickness 42 is less than 0.060 inch (1.52 mm). The core 40 may include an aperture 46 with a radiused edge 48 providing the second thickness 44 of less 0.020 inch (0.51 mm), for example. The cast airfoil 26 provides a cooling passage 53 and standoff 50 corresponding to the aperture 46. The standoff 50 illustrated in FIG. 3D is shown in the area indicated in FIG. 6A.

Figure 4:
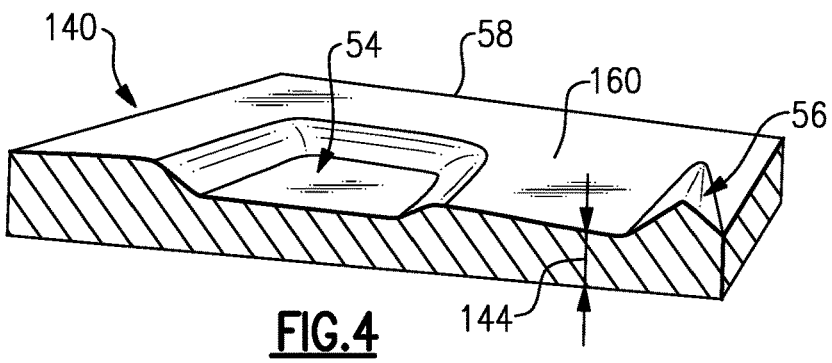
FIG. 4 is a perspective view of another example core.

Referring to FIG. 4, the core 140 includes an exterior surface 160 having a perimeter 58. A recess 54 may be arranged inboard of the perimeter 58, for example. In another example, a protrusion 56 is arranged inboard of the perimeter 58. The recess 54 and protrusion 56 are not machined. The thickness of the core 140 surrounding the recess 54 and protrusion 56 is less than 0.060 inch (1.52 mm) in one example, and less than 0.020 inch (0.51 mm) in another example.

Figure 5A:
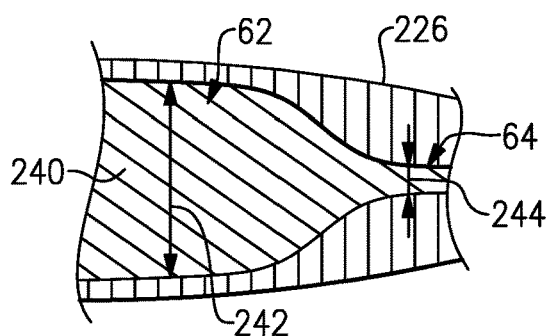
FIG. 5A is a cross-sectional view of a portion of another example core and airfoil.
Figure 5B:
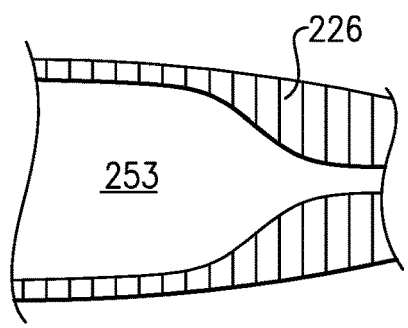
FIG. 5B is a cross-sectional view of the airfoil shown in FIG. 5A without the core.

In another example shown in FIGS. 5A-5B, the core 240 may be used to produce an airfoil 226 including a cooling passage 253 having a tapered wall. The core 240 is tapered between first and second portions 62, 64 with the second portion 64 having a second thickness 244 less than 0.020 inch (0.51 mm). The first portion 62 has a first thickness 242 that is greater than 0.020 inch (0.51 mm).

Figure 6A:
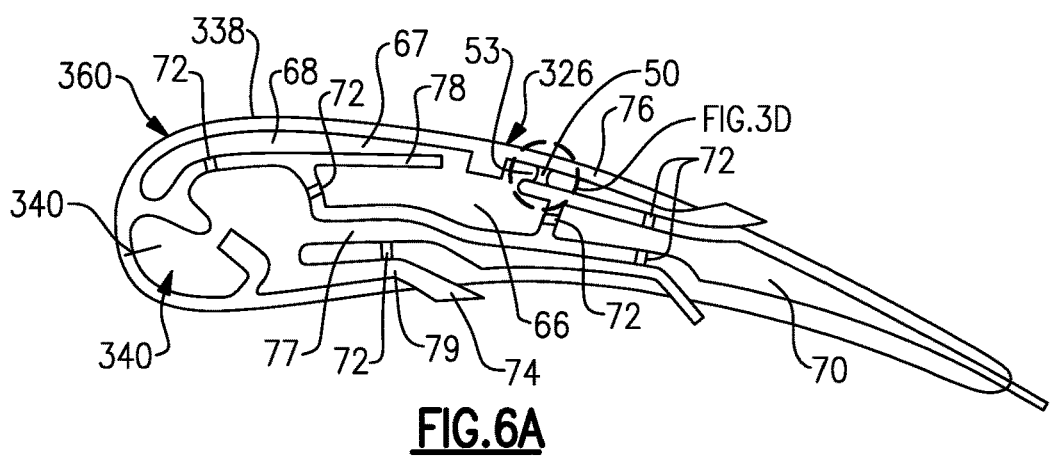
FIG. 6A is a cross-sectional view of another example core and airfoil.
Figure 6B:
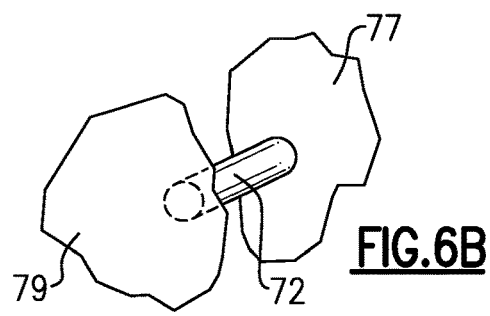
FIG. 6B is a perspective view of a portion of the core shown in FIG. 6A.

Referring to FIGS. 6A-6B, which depicts a core within an airfoil, the exterior airfoil surface 360 is defined by a perimeter wall 76. First, second and third cooling passages 66, 68, 70 are provided within the airfoil 326, for example. An interior wall 78 is arranged interiorly and adjacent to the perimeter wall 76 to provide the second cooling passage 67, for example. A cooling passage, for example, first cooling passage 66 is tapered and respectively has different thickness, for example, as described above with respect to FIGS. 5A and 5B. At least one of the passages, for example, second passage 67, may include a thickness less than 0.060 inch (1.52 mm). The cooling passages are formed by correspondingly shaped core structure. The core 340 is provided by a unitary structure having uniform material properties, for example. That is, multiple core elements constructed from different core materials glued to one another need not be used.

Figure 10:
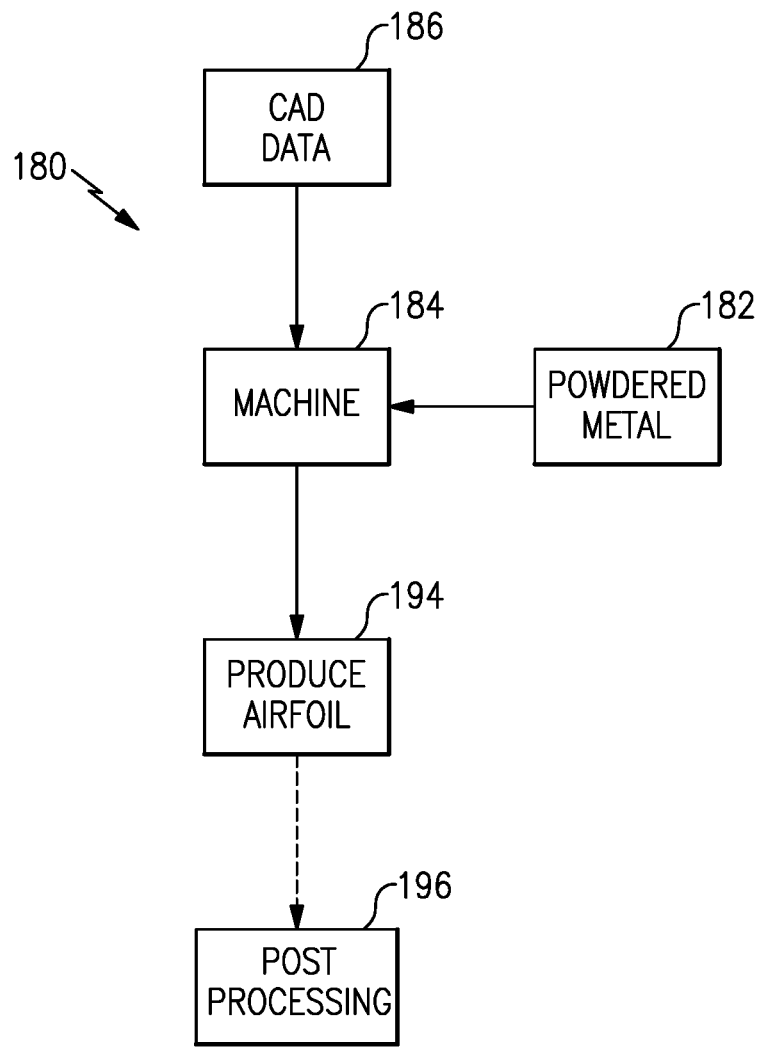
FIG. 10 is a flow chart depicting an example airfoil manufacturing process.

The core 340 may include first and second portions 77, 79 overlapping one another. The first and second portions 77, 79 are less than 0.060 inch (1.52 mm) thick, in one example, and of varying thickness. At least one of the first and second portions 77, 79 may provide a film cooling hole 74 in the exterior airfoil surface 360. The first and second portions 77, 79 may be joined to one another by a standoff 72 that produces a hole interconnecting the resultant overlapping cooling passages. Standoffs 72 can be used to integrally connect and join all passages 66, 68, 70 to eliminate the need for core assembly and better stabilize the core during casting. However, directly manufacturing the airfoil, as shown in FIG. 10, would not require these features.

Figure 7:
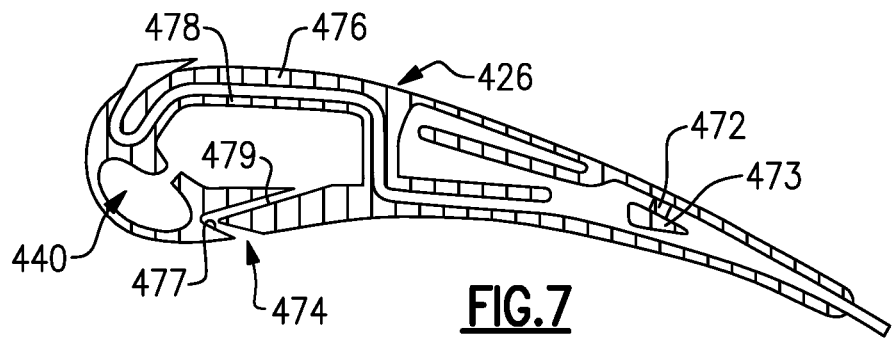
FIG. 7 is a cross-sectional view of another example core and airfoil.
Figure 8:
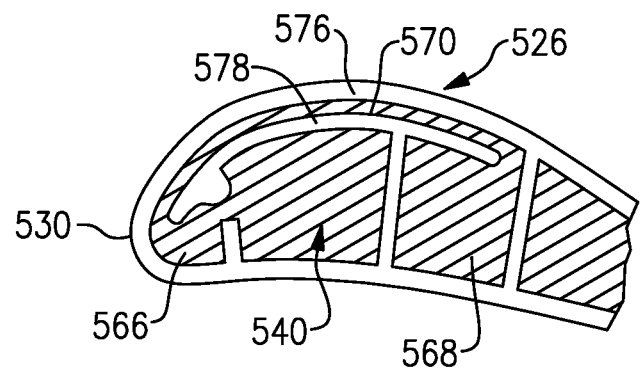
FIG. 8 is a cross-sectional view of another example core and airfoil.

Similarly, a unitary body having uniform material properties throughout the structure provides the cores 440, 540 shown in FIGS. 7 and 8. The core 440, 540 have at least one portion with a thickness of less than 0.060 inch (1.52 mm). Referring to the airfoil 426 of FIG. 7, the perimeter wall 476 defines first and second cooling passages 477, 479 with the interior wall 478. The first and second cooling passages 477, 479 are arranged in a switch back configuration, and one of the passages may provide a film cooling hole 474. The standoff 472 interconnects a central wall 473, which splits the channel to increase hot wall contact and maintain flow speed and pressure.

Referring to the airfoil 526 of FIG. 8, the first cooling passage 566 is arranged adjacent to the perimeter wall 576 at the leading edge 530. The third cooling passage 570 is arranged between the perimeter wall 576 and the interior wall 578 to provide a microcircuit of less than 0.060 inches (1.52 mm) thickness, interconnecting the first and second cooling passages 566, 568 to one another.

Figure 9:
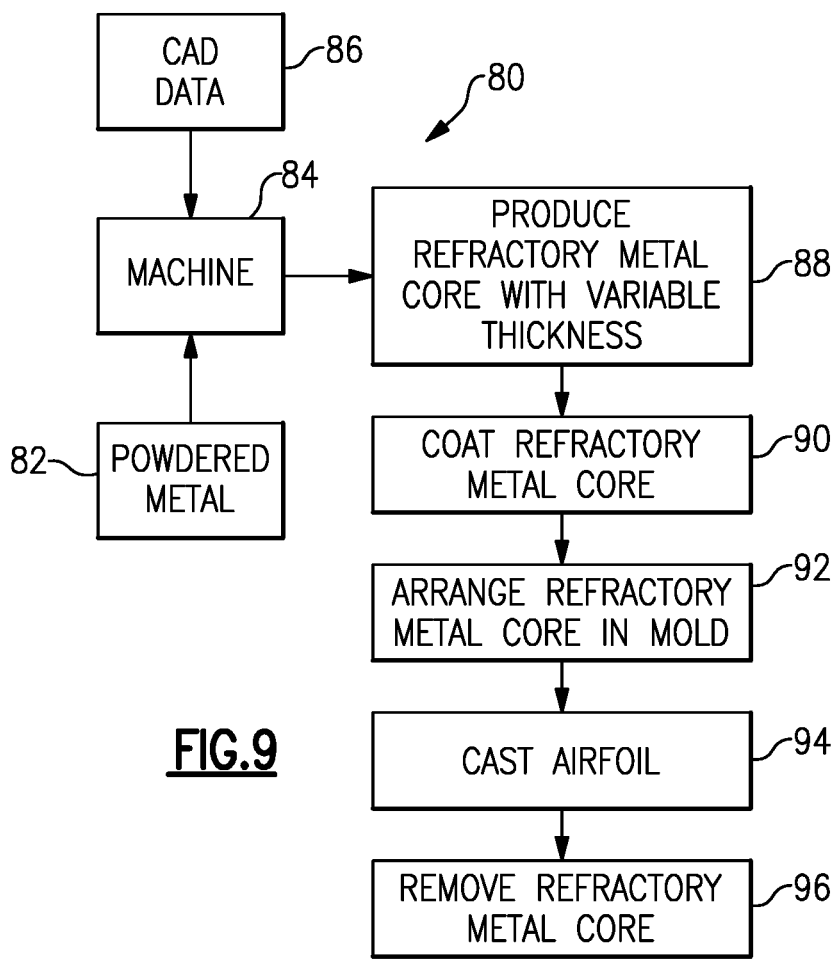
FIG. 9 is a flow chart depicting an example refractory metal core manufacturing process.

The core geometries and associated airfoil cooling passages disclosed in FIGS. 3A-8 may be difficult to form using conventional casting technologies. Thus, an additive manufacturing process 80 may be used, as schematically illustrated in FIG. 9. Powdered metal 82 suitable for refractory metal core applications, such as molybdenum, is fed to a machine 84, which may provide a vacuum, for example. The machine 84 deposits multiple layers of powdered metal onto one another. The layers are joined to one another with reference to CAD data 86, which relates to a particular cross-section of the core 40. In one example, the powdered metal 82 may be melted using a direct metal laser sintering process or an electron-beam melting process. With the layers built upon one another and joined to one another cross-section by cross-section, a core with the above-described geometries may be produced, as indicated at 88. A single piece core can be produced that requires no assembly and can be directly placed into a mold after being coated with wax.

The coating 90 may be applied to the exterior surface of the core 40, which enables the core 40 to be more easily removed subsequently. The core 40 is arranged in a multi-piece mold and held in a desired orientation by features on the mold, as indicated at 92. The core 40 is more robust and can better withstand handling as it is positioned within the mold. The airfoil 26 is cast about the core 40, as indicated at 94. The core 40 is then removed from the airfoil 26, as indicated at 96, to provide desired cooling passage features.

An additive manufacturing process 180 may be used to produce an airfoil, as schematically illustrated in FIG. 10. Powdered metal 182 suitable for aerospace airfoil applications is fed to a machine 184, which may provide a vacuum, for example. The machine 184 deposits multiple layers of powdered metal onto one another. The layers are joined to one another with reference to CAD data 186, which relates to a particular cross-section of the airfoil 20. In one example, the powdered metal 182 may be melted using a direct metal laser sintering process or an electron-beam melting process. With the layers built upon one another and joined to one another cross-section by cross-section, an airfoil with the above-described geometries may be produced, as indicated at 194. The airfoil may be post-processed 196 to provide desired structural characteristics. For example, the airfoil may be heated to reconfigure the joined layers into a single crystalline structure.

The film cooling hole 474 of FIG. 7 is shown in more detail in FIGS. 11, 12, 13 and 14. The first and second cooling passages 477, 479, or outlet and inlet passages, in the wall 476 of airfoil 426 respectively correspond to outlet and inlet passages. The outlet passage 477 provides a fluid exit in the exterior airfoil surface 460. The outlet passage 477 provides a diffuser portion that has a diffuser shape such that its cross-sectional area increases for at least a portion of the length of the outlet passage 477, decreasing the velocity of the fluid. The inlet passage 479 provides a metering portion that has a cross-sectional area that is less than the cross-sectional area of the outlet passage 477 and which is designed to meter the flow of the fluid from the interior cooling passage 466 through the film cooling hole 474.

Figure 11:
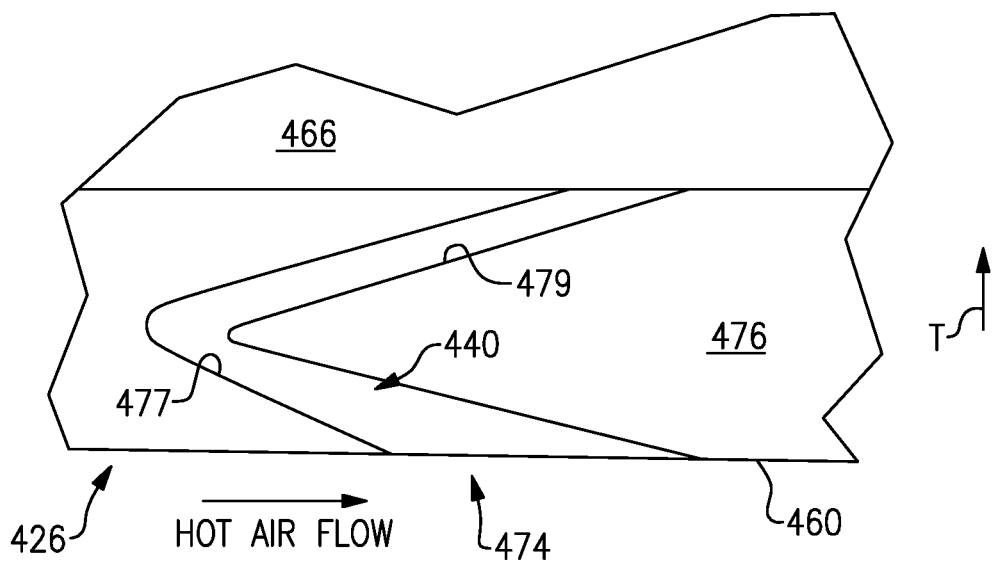
FIG. 11 illustrates a film cooling hole and passage of FIG. 7 in more detail.
Figure 12:
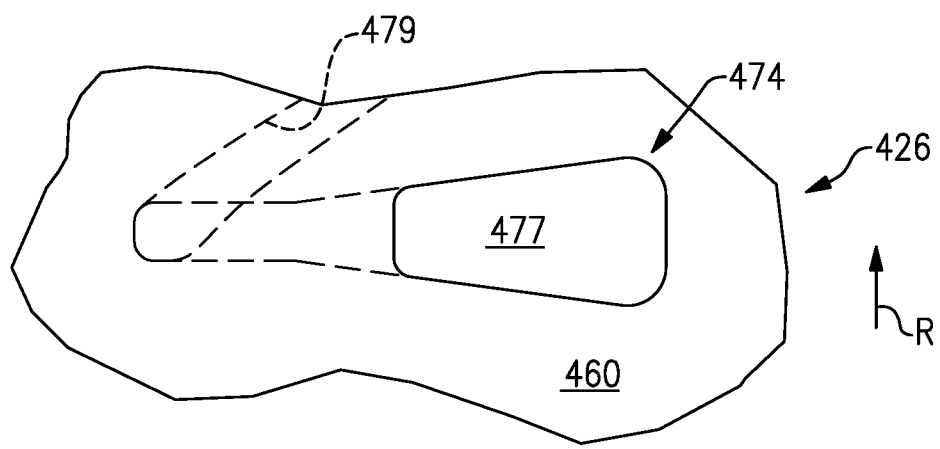
FIG. 12 is an elevational view of the film cooling hole shown in FIG. 11.

Using the additive manufacturing techniques described in this disclosure, the outlet and inlet passages 477, 479 can be substantially misaligned with one another, i.e., non-line of sight with respect to one another. In the example shown, the outlet and inlet passages 477, 479 are each generally linear and arranged at an acute angle with respect to one another in the wall thickness direction T (FIG. 11). The outlet and inlet passages 477, 479 may also be angled relative to one another in another direction, such as the radial direction R (FIG. 12). Such a switch back configuration can be packaged more easily in some wall geometries and may reduce cooling flow blow off.

The film cooling hole 474 may be formed during an additive manufacturing process of the airfoil 426. Alternatively, a core 440 (FIG. 11) may be constructed using additive manufacturing and which is used to provide the correspondingly shaped film cooling hole 474 when casting the airfoil 426. Thus, the film cooling hole 474 is not machined. Cores 540, 640 may also be used to form the cooling holes 574, 674 described in FIGS. 13 and 14 below.

A hybrid manufacturing method may also be used. That is, the diffusion portion and an aligned metering section (FIGS. 13 and 14 below), if any, can be electro discharge machined, while the non-aligned metering section can be additively manufactured by either additively making the core, or by additively making the airfoil directly.

Figure 13:
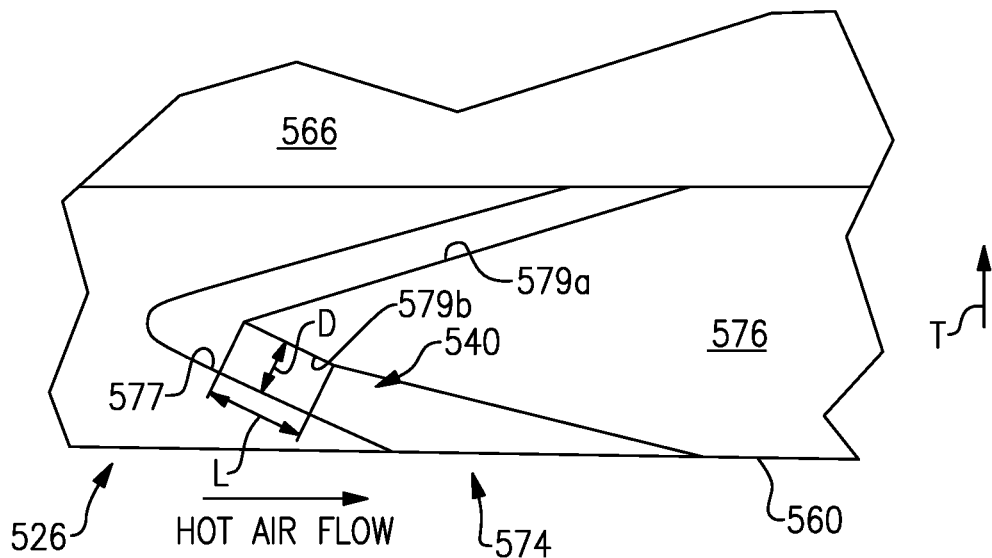
FIG. 13 illustrates another film cooling hole and passage.

Another film cooling hole 574 is shown in FIG. 13. The first and second cooling passages in the wall 576 of airfoil 526 respectively correspond to the outlet passage 577 and inlet passage having metering portions 579a, 579b. The outlet passage 577 provides a fluid exit in the exterior airfoil surface 560. The outlet passage 577 has a diffuser shape such that its cross-sectional area increases for at least a portion of the length of the outlet passage 577, decreasing the velocity of the fluid.

The inlet passage is provided by multiple metering portions 579a, 579b, which have a cross-sectional area that is less than the cross-sectional area of the outlet passage 577 and which is designed to meter the flow of the fluid from the interior cooling passage 566 through the film cooling hole 574. In the example shown in FIG. 13, the metering portion 579a is straight. The metering portion 579b has a diameter D (hydraulic diameter D if the cross-sectional area of the metering section 579b is not circular) and a length L that provides an L/D ratio of greater than 1, and in one example, greater than 3.

Figure 14:
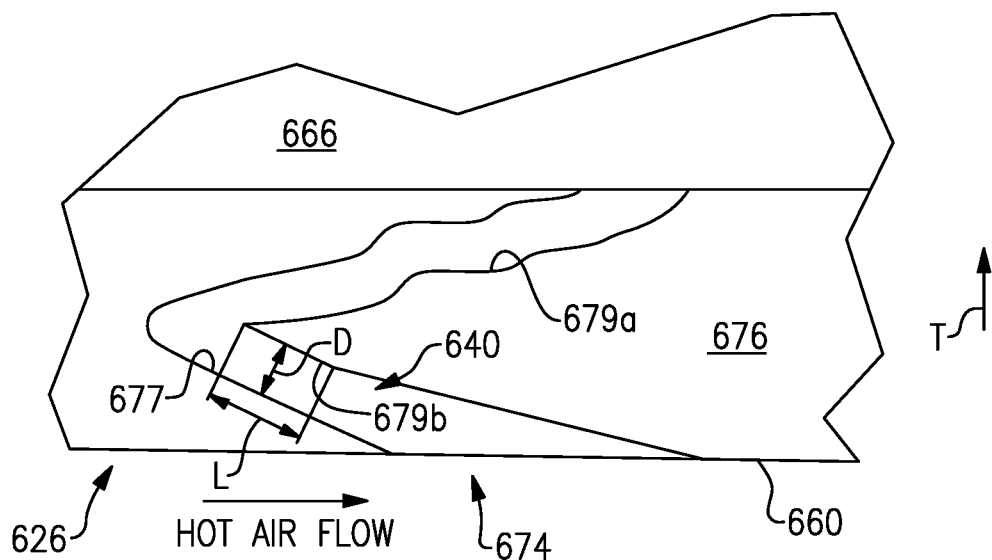
FIG. 14 illustrates still another film cooling hole and passage.

Another example film cooling hole 674 is shown in FIG. 14. The first and second cooling passages in the wall 676 of airfoil 626 respectively correspond to the outlet passage 677 and inlet passage having metering portions 679a, 679b. The outlet passage 677 provides a fluid exit in the exterior airfoil surface 660. The outlet passage 677 has a diffuser shape such that its cross-sectional area increases for at least a portion of the length of the outlet passage 677, decreasing the velocity of the fluid.

The inlet passage is provided by multiple metering portions 679a, 679b, which have a cross-sectional area that is less than the cross-sectional area of the outlet passage 677 and which is designed to meter the flow of the fluid from the interior cooling passage 666 through the film cooling hole 674. In the example shown in FIG. 14, the metering portion 679a is non-linear. The metering portion 679b has a diameter D (hydraulic diameter D if the cross-sectional area of the meetering section 579b is not circular) and a length L that provides an L/D ratio of greater than 1, and in one example, greater than 3.

The outlet passage 477, 577, 677 provides the diffuser, which could be compound diffusion shaped, multi-lobe shaped, chevron-shaped, for example. The cross-section of the inlet passage 479, 579a/579b, 679a/679b, which provides the metering portion, could be circular, oblong-shaped, crescent, or cusp-shaped, for example.

Although an example embodiment has been disclosed, a worker of ordinary skill in this art would recognize that certain modifications would come within the scope of the claims. For example, the disclosed cores, cooling passages and cooling holes may be used for applications other than airfoils, such as combustor liners, blade outer air seals (BOAS) and platforms. For that reason, the following claims should be studied to determine their true scope and content.

What is claimed is:

1. A component for a gas turbine engine comprising:
a wall adjoining an interior cooling passage and providing an exterior surface, and
a film cooling hole within the wall that fluidly connects the interior cooling passage and the exterior surface, the film cooling hole including inlet and outlet passages that are arranged together to form a V-shape within the wall that defines a flow path for fluid flowing therethrough,
wherein a first end of the inlet passage disposed in a first leg of the V-shape is fluidly connected to a second end of the outlet passage disposed in a second leg of the V-shape,
wherein the fluid that flows through the first leg along the flow path of the first leg is a non-linear flowpath along an entire length of the first leg,
wherein the inlet passage includes first and second metering portions, the second metering portion being disposed in the second leg and adjoining the outlet passage, the second metering portion having a length L and a diameter D along an entire length of the second metering portion and an L/D ratio of greater than 1.

2. The component according to claim 1, wherein the outlet passage is generally linear.

3. The component according to claim 2, wherein the inlet and outlet passages are arranged at an angle relative to one another.

4. The component according to claim 3, wherein the angle is acute.

5. The component according to claim 1, wherein the L/D ratio is greater than 3.

6. The component according to claim 1, wherein the wall is additively manufactured to form the film cooling hole.

7. The component according to claim 1, wherein the component is one of an airfoil, combustor, blade outer air seal (BOAS) and platform.

8. The component according to claim 1, wherein a cross-section of the inlet passage is one of a circular, oblong, crescent, and cusp shape.

9. The component according to claim 1, wherein the cross-sectional area of the outlet passage increases for at least a portion of a length of the outlet passage.

10. A method of manufacturing an airfoil component for a gas turbine engine, comprising:
depositing multiple layers of a powdered metal onto one another;
joining the layers to one another with reference to computer-aided design (CAD) data relating to a particular airfoil cross-section of an airfoil component, the joining the layers to form a core having a film cooling hole geometry corresponding to inlet and outlet passages that are arranged together to form a V-shape within a wall,
wherein a first end of the inlet passage disposed in a first leg of the V-shape is fluidly connected to a second end of the outlet passage disposed in a second leg of the V-shape, such that the inlet and outlet passages have a misaligned, non-line of sight relationship with one another,
wherein the inlet passage has a cross-sectional area that is less than a cross-sectional area of an outlet portion, and wherein the cross-sectional area, of the outlet passage increases for at least a portion of a length of the outlet passage,
wherein the fluid that flows through the first leg along the flow path of the first leg is a non-linear flowpath along an entire length of the first leg, and
wherein the inlet passage includes first and second metering portions, the second metering portion being disposed in the second leg and adjoining the outlet passage, the second metering portion having a length L and a diameter D along an entire length of the second metering portion and an L/D ratio of greater than 1.

11. The method according to claim 10, wherein the joining step includes manufacturing a core providing the film cooling hole geometry.

12. The method according to claim 11, wherein the core includes molybdenum.

13. The method according to claim 10, wherein the outlet passages is generally linear.

14. The method according to claim 13, wherein the inlet and outlet passages are arranged at an angle relative to one another.

15. The method according to claim 14, wherein the angle is acute.

16. The method according to claim 10, wherein the inlet passage is formed during the depositing step, and the outlet passage is provided by machining.

* * * * *